Figure 1:
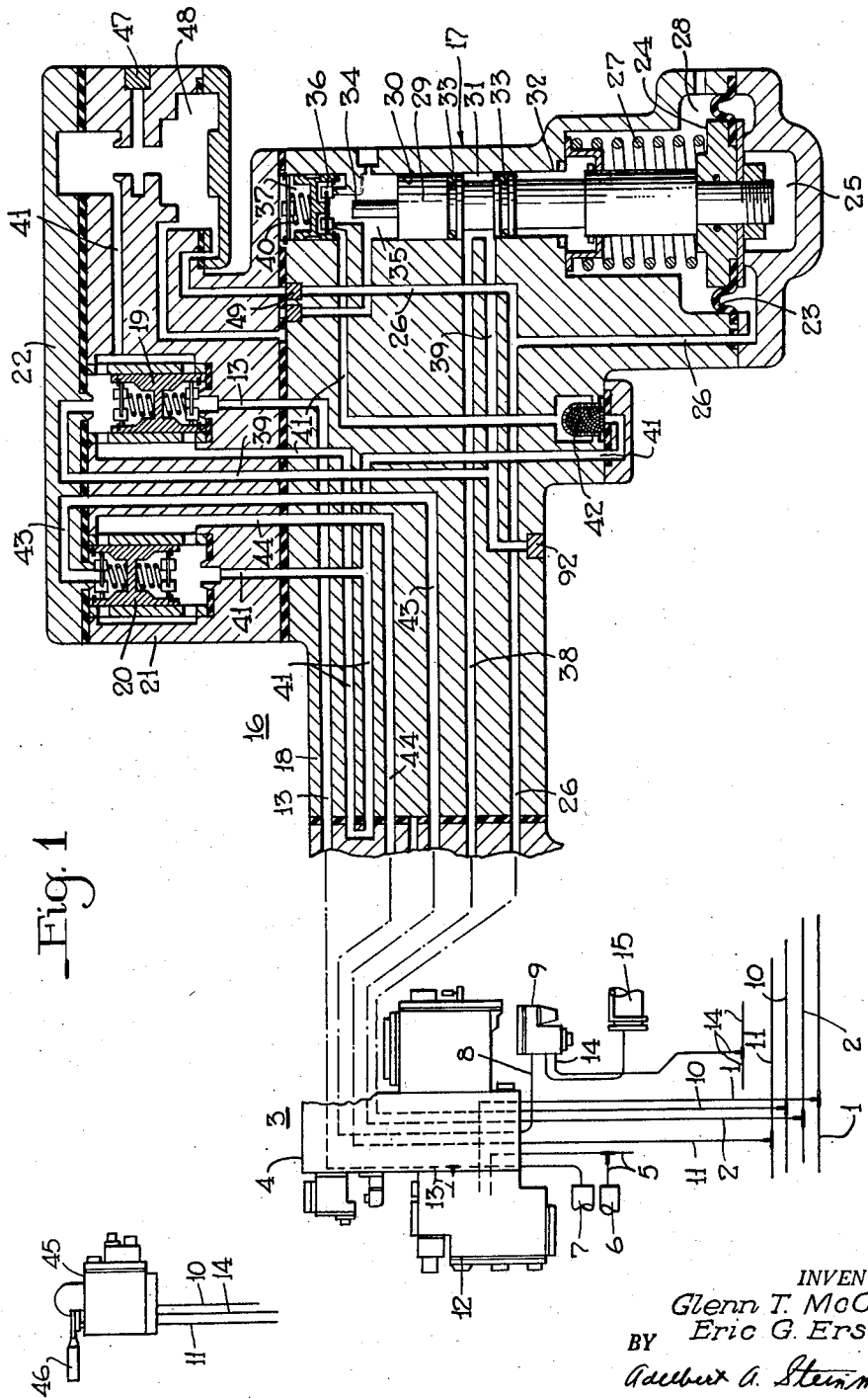

INVENTORS
Glenn T. McClure
Eric G. Erson
BY Adelbert O. Steinmiller
ATTORNEY

2,829,008

FLUID PRESSURE BRAKE APPARATUS WITH IMPROVED INDEPENDENT APPLICATION AND RELEASE VALVE DEVICE

Glenn T. McClure, McKeesport, and Eric G. Erson, Export, Pa., assignors to Westinghouse Air Brake Company, Wilmerding, Pa., a corporation of Pennsylvania Application September 28, 1955, Serial No. 537,165

11 Claims. (Cl. 303—26)

This invention relates to fluid pressure brake apparatus for a railway locomotive and more particularly to an improved independent application and release valve device adapted to be associated with a brake controlling valve device on a locomotive for permitting brakes on the locomotive to be applied and released in unison with, or independently of, the brakes on the connected cars of a train.

In Westinghouse Air Brake Company's Instruction Leaflet No. 2606–1 dated February 1950, there is shown and described a No. 24–RL locomotive brake equipment having a brake controlling valve device comprising an independent application and release valve device which, in turn, comprises an application and release selector valve, a quick release valve and two double check valves. Whenever locomotive brakes are applied either automatically or electro-pneumatically in unison with those on the cars, a certain passage will be charged with fluid under pressure past one of the double check valves. The second double check valve operates to selectively connect to a brake cylinder relay valve either said certain passage or an independent application and release passage, whichever is charged with fluid at the preponderant pressure. The selector valve is biased by main reservoir pressure acting on a small piston to a normal position, in which the independent passage is connected to an independent application and release pipe, and the usual straight air pipe is connected to said one double check valve, for permitting operation in the manner just described. When, however, fluid at main reservoir pressure is supplied via a normally vented actuating pipe to a larger piston, the selector valve will move to a release position in which the independent passage is cut off from the independent pipe and main reservoir air is supplied to a first chamber in the quick release valve for causing it to unseat a quick release check valve and thereby connect the brake cylinder relay valve to atmosphere.

With an independent application and release valve device of this type, instances have been reported where, due to such as faulty maintenance, the selector valve may stick in release position and/or the quick release check valve may not properly seat and hence undesirably continue to maintain the brake cylinder relay valve open to atmosphere when the actuating pipe is vented for the purpose of providing control of locomotive brakes in unison with those on the cars. If this should occur, no brake application (independent, automatic or straight air) can be effected on the locomotive, except in a special case where an independent brake valve having a special lockdown feature is in lockdown position, in which case an emergency brake will be available after a lapse of about 18 seconds from the time of initial movement of the selector valve to its release position.

It is therefore the object of this invention to provide an improved independent application and release valve device embodying a novel arrangement whereby a brake application may always be effected on the locomotive even under the conditions above described, and which eliminates the need for an independent brake valve having the special lockdown feature.

Another object is to provide an improved independent application and release valve device in which the independent application and release pipe and passage are connected directly to one side of the aforementioned second double check valve in by-pass of the selector valve, and in which the selector valve in release position vents the aforementioned certain passage but not said brake cylinder relay valve, thereby assuring the availability of an independent brake application on the locomotive even if the selector valve should stick in release position.

Another object is to provide an improved commercial independent application and release valve device which, when an automatic or electro-pneumatic brake application is in effect throughout the the train, permits brakes on the locomotive to be smoothly and promptly released to any desired lesser degree, corresponding to the preselected pressure in the independent application and release pipe.

Another object is to provide an independent application and release valve device embodying an improved selector or release valve device which is lower in cost and has less inherent friction than selector valve devices heretofore proposed, and which is biased to normal position by a spring acting on a single diaphragm piston instead of by main reservoir pressure acting on the smaller of two pistons.

Another object is to provide an improved independent application and release valve device embodying, in addition to the features described in the foregoing objects, novel means (Fig. 2) for locking out an electro-pneumatic brake application on the locomotive following an independent release of such application on the locomotive and until such application is completely released on the connected cars, for reasons hereinafter to be explained.

Another object is to provide an improved independent application and release valve device embodying two release valve devices (Fig. 3) arranged in series to control a release communication via which an automatic or electro-pneumatic brake application is independently released on the locomotive, so that so long as at least one of these release valve devices functions properly, locomotive brakes may be controlled automatically or electro-pneumatically, despite the existence of certain conditions hereinafter to be described.

Figure 2:
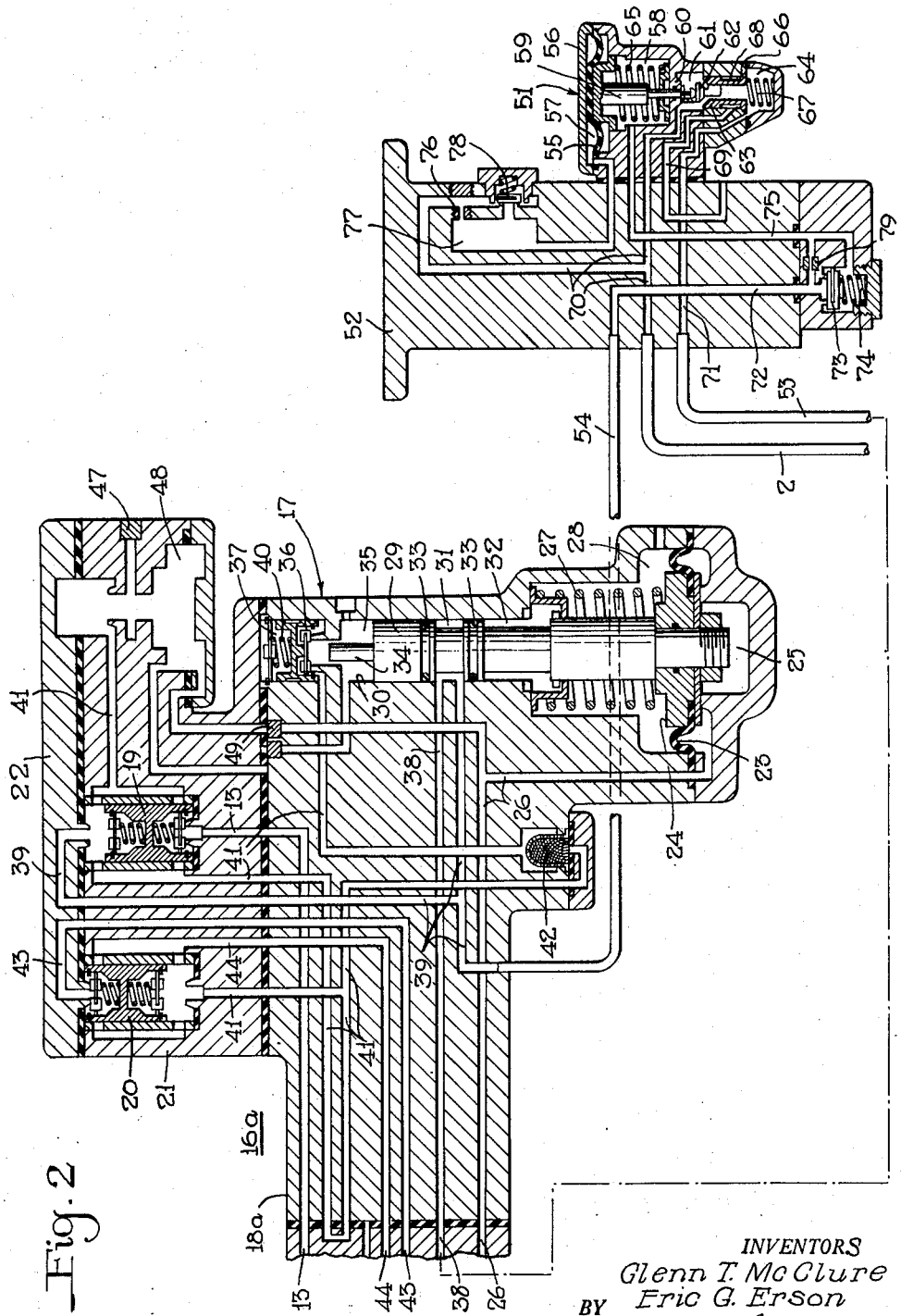
Figure 3:
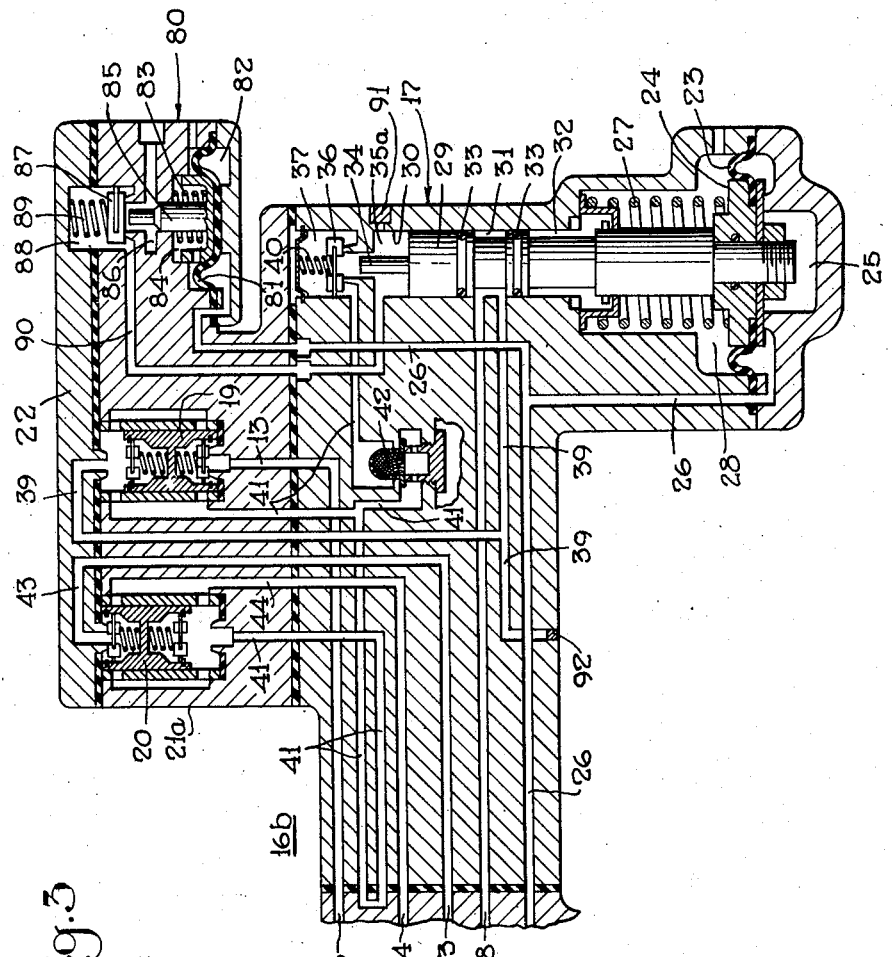

Other objects and advantages will become apparent from the following more detailed description of the invention and from the accompanying drawings, wherein:

Fig. 1 is a view, partly diagrammatic and partly in outline, of an independent application and release valve device embodying the invention and shown, for sake of illustration, in association with other components of a No. 24–RL locomotive brake equipment; and Figs. 2 and 3 are diagrammatic views of other embodiments of the improved independent application and release valve device.

GENERAL DESCRIPTION

Since the independent application and release valve device, in its various embodiments, may for sake of illustration be used with a locomotive brake apparatus of the 24–RL type described in the aforementioned leaflet, the disclosure in the accompanying drawings and in the following description has been limited to only such structure as is essential for a clear understanding of the present invention.

*Description and operation.—Fig. 1*

As shown in this figure, the brake apparatus comprises the usual brake pipe 1 and usual electro-pneumatic straight air pipe 2, both of which are adapted to extend from a locomotive through the cars of a train. An engineer's automatic brake valve device (not shown) is provided, which may be of the type designated in the aforementioned leaflet as a "DSE-24 Brake Valve" and having an adjustable shifter lever to adapt said device for controlling, selectively, the pressures of fluid in the brake pipe 1 and straight air pipe 2, so as to control brakes on the automatic principle or electro-pneumatic straight air principle, respectively, in the well-known manner.

A brake controlling valve device 3, provided on the locomotive, comprises a pipe bracket 4, to which are connected the pipes 1 and 2, a pipe 5 leading to an auxiliary reservoir 6, a displacement volume 7, a control pipe 8 leading to a brake cylinder relay valve device 9, an actuating pipe 10, and an independent application and release pipe 11. The valve device 3 also comprises a service portion 12 which is mounted on bracket 4 and responds to a service rate of reduction in brake pipe pressure to supply fluid under pressure from the auxiliary reservoir 6 to a passage 13 and thence to displacement volume 7 and also (via a communication hereinafter to be described) to the relay valve device 9 for causing the latter to operate to supply fluid at a corresponding pressure from a main reservoir pipe 14 to a brake cylinder device 15 for applying brakes on the locomotive. When, by such flow to the relay valve device 9, auxiliary reservoir pressure has been reduced to a degree slightly lower than brake pipe pressure, the service portion 12 will move to a lap position for preventing further flow to the displacement volume 7 and relay valve device 9, and thereby cause the latter to bottle up fluid in the brake cylinder device 15 at the desired pressure. When the brake pipe 1 is subsequently recharged, the service portion 12 will move to a release position in which passage 13 is vented for venting displacement volume 7 and causing the relay valve device 9 to vent brake cylinder device 15 to release the locomotive brakes.

According to the invention, an independent application and release valve device 16 embodying the invention comprises an independent release or selector valve device 17 contained in a casing portion 18 that is preferably mounted on one face of the pipe bracket 4, and also comprises two double check valves 19, 20 contained in a casing portion 21 that is mounted on the casing portion 18 and is enclosed by a cover portion 22.

The independent release valve device 17 may, for sake of illustration, comprise an annular flexible diaphragm 23, suitably clamped about its outer edge between sections of casing portion 18 and about its inner edge between parts of a diaphragm follower assemblage 24. The diaphragm 23 is subject at one side to pressure of fluid in a chamber 25 that is constantly open to the actuating pipe 10 via a passage 26; said diaphragm being subject at the opposite side to pressure of a helical bias spring 27 in an atmospheric chamber 28. Preferably formed integrally with one of the parts of the follower assemblage 24 is a cylindrical slide valve 29 that is slidably mounted in an aligned bore 30 open to chamber 28. Intermediate its ends, valve 29 has an elongated annular cavity 31, and also preferably has another elongated cavity 32 spaced from cavity 31, for reasons hereinafter to be explained. O-rings 33 are carried in suitable grooves in the valve 29 at each side of the cavity 31 for preventing leakage of fluid from said cavity along the valve bore 30. At its projecting end, the valve 29 has a reduced diameter portion, hereinafter referred to as a stem 34, which projects through an atmospheric chamber 35 (defined in part by the base of bore 30) and is adapted to unseat a check valve 36 that controls flow from a chamber 37 to chamber 35.

When actuating pipe 10 and hence chamber 25 of release valve device 17 is vented, the release valve 29 is urged to a normal position, in which it is shown, by pressure of spring 27. In this position, valve cavity 31 connects a passage 38 open to the straight air pipe 2 with a passage 39 leading to one end of double check valve 19; cavity 32 is exposed solely to chamber 28; and stem 34 is disengaged from check valve 36 for permitting a bias spring 40 in chamber 37 to hold said check valve seated.

Branches of the passages 13, 39 lead to opposite ends of the double check valve 19, which is adapted to selectively connect whichever one of these passages is charged with fluid at the preponderant pressure to a passage 41 containing an air strainer 42 and leading to chamber 37 of valve device 17.

A branch of passage 41 leads to one end of double check valve 20; and an independent application and release passage 43, which is constantly open to pipe 11, leads to the opposite end of said double check valve. This double check valve is adapted to selectively connect whichever one of the passages 41, 43 is charged with fluid at the preponderant pressure to a passage 44 leading to control pipe 8.

For controlling the pressures of fluid in the actuating pipe 10 and in the independent application and release pipe 11, there is provided the usual engineer's independent brake valve device 45, which is preferably of the type designated in the aforementioned leaflet as the "S-40-F Independent Brake Valve," without the lockdown feature. This brake valve device 45 comprises, briefly, self-lapping valve means (not shown) operable by movement of a handle 46 to a release position to open both the pipes 10 and 11 to atmosphere, and operable by arcuate movement of said handle in a horizontal plane from release position into an application zone for maintaining the actuating pipe 10 vented while supplying fluid from main reservoir pipe 14 to the independent application and release pipe 11 at a pressure proportional to the extent of such movement; said brake valve device also comprising valve means (not shown) operable by depressing said handle against a spring bias while in release position or in the application zone for causing main reservoir air to flow from pipe 14 to the actuating pipe 10.

In operation, assume that the independent brake valve handle 46 is in its release position, in which the pipes 10, 11 are vented; and that the aforementioned engineer's automatic brake valve device has been adjusted for automatic operation and is actuated to a release position for charging or recharging the brake pipe 1 to normal operating value, while venting the straight air pipe 2.

Under this condition, the service portion 12 of the brake controlling valve device 3 will operate to charge the auxiliary reservoir 6 and to vent the passage 13 for thereby venting the displacement volume 7. Also, chamber 25 of the release valve device 17 will be vented via the vented actuating pipe 10 and hence the valve 29 will be in its normal position, in which cavity 31 maintains passage 39 vented via the vented straight air passage 38. With passages 13 and 39 thus vented, passage 41 will be vented past the double check valve 19. With passages 41 and 43 vented, passage 44 will be vented past the double check valve 20 for thereby venting pipe 8 and thus causing the brake cylinder relay valve device 9 to vent the brake cylinder device 15.

When, by previously described operation of the service portion 12 of brake controlling valve device 3, fluid under pressure is supplied to passage 13, such fluid will flow to the displacement volume 7 and also to the lower end of double check valve 19 and shift the latter to an upper position, in which it seals off passage 39 and permits such fluid to flow from passage 13 to passage 41; whence it will flow to the lower end of double check valve 20 for shifting the latter to an upper position, in which it is shown, and in which it seals off passage 43 and permits such fluid to flow from passage 41 to passage 44 and thence via pipe 8 to brake cylinder relay valve device 9 for causing the latter to operate to provide fluid at a corresponding pressure in the brake cylinder device 15 for thereby applying brakes to a degree corresponding to the extent of service reduction in brake pipe pressure.

When brake pipe pressure is subsequently increased, the service portion 12 will operate to release fluid under pressure from the passage 13, and hence from the displacement volume 7 and pipe 8 by reverse flow through the communication just described, for releasing brakes.

Assume now that the aforementioned engineer's automatic brake valve device is adjusted for electro-pneumatic operation. When fluid under pressure is supplied to the straight air pipe 2, such fluid will flow via passage 38 and through cavity 31 of release valve 29 in normal position to passage 39 for shifting the double check valve 19 to a lower position, in which it is shown, for sealing off passage 13 and permitting such fluid to flow from passage 39 to passage 41 and thence via communication just described, including the double check valve 20 in upper position, to the brake cylinder relay valve device 9 for causing brakes to be applied to a degree corresponding to the straight air pipe pressure. Upon release of fluid under pressure from the straight air pipe 2, relay valve device 9 will be vented by reverse flow of fluid through the communication just described, for causing a release of brakes.

When locomotive brakes are controlled by variations in brake pipe pressure or in straight air pipe pressure, as just described, brakes on the connected cars will be similarly controlled, and hence locomotive brakes will be controlled in unison with those on said cars. If, however, it is desired to apply brakes on the locomotive but not on the cars, or if it is desired to apply brakes on the locomotive to a greater degree than then existing on the locomotive and cars, the handle 46 of the independent brake valve device 45 is moved into the application zone to provide in the independent application and release pipe 11 and hence in passage 43 fluid at a chosen pressure which is higher than any pressure then existing in the passage 13 (if an automatic application is then in effect throughout the train) or in the passage 39 (if an electro-pneumatic brake application is then in effect throughout the train), while continuing to maintain the actuating pipe 10 vented.

Fluid under pressure thus supplied to the independent application and release passage 43 will shift the double check valve 20 to a lower position for sealing off passage 41 and permitting fluid to flow from passage 43 to passage 44 and thence to relay valve device 9 for causing brakes on the locomotive to be applied to a degree corresponding to the presure of fluid in passage 43, as will be understood from previous description. If passage 43 is thereafter vented while brakes are released on the cars, the independent brake application on the locomotive will be released by reverse flow of fluid through the communication just described. If, however, passage 43 is vented while an automatic or electro-pneumatic brake application is then in effect on the connected cars, the double check valve 20 will be shifted to its upper position by preponderant pressure in passage 41 (as supplied via passage 13 or 39, respectively, and double check valve 19) for again controlling brakes on the locomotive in unison with those on the connected cars.

Assume now that either an automatic or an electro-pneumatic brake application is in effect throughout the train, and that it is desired to completely release the locomotive brakes while maintaining brakes applied on the connected cars. To this end, the handle 46 of the independent brake valve device 45 is depressed in release position for supplying main reservoir air from pipe 14 to the actuating pipe 11 and hence via passage 26 to chamber 25 of release valve device 17, while maintaining pipe 11 and passage 43 vented. Pressure of fluid thus supplied to chamber 25 will deflect diaphragm 23 against resistance of spring 27 for shifting the release valve 29 to a release position, in which the valve cavity 31 is exposed solely to straight air passage 38; valve cavity 32 vents passage 39 via atmospheric chamber 28, if the latter passage is then charged by virtue of an electro-pneumatic brake application then being in effect on the cars; and stem 34 unseats check valve 36 for releasing fluid under pressure from passage 41 via chamber 37 and atmospheric chamber 35. With passages 41 and 43 thus vented, pipe 8 will be vented via the double check valve 20 for causing the relay valve device 9 to effect a complete release of air from the brake cylinder device 15 for completely releasing locomotive brakes.

It should be noted that with the release valve 29 in its release position, passage 39 will be vented via the double check valve 19 and the vent passage 41; and hence it will be seen that cavity 32 is not essential to venting of passage 39. However, cavity 32, by providing an additional vent for passage 39, provides a more rapid release of an electro-pneumatic application on the locomotive, especially in multi-unit operation, and is therefore desirable.

Assume now that either an automatic or an electro-pneumatic brake application is in effect throughout the train, and that is desired to partially (instead of completely) release locomotive brakes while maintaining brakes applied to a greater degree on the connected cars. To this end, the handle 46 of the independent brake valve device 45 is moved arcuately into the application zone for providing in the independent application and release pipe 11 and passage 43 fluid at a pressure corresponding to the desired degree of brake application to be retained on the locomotive (as determined by the extent of such arcuate movement), and then said handle is depressed for charging the actuating pipe 10 and hence chamber 25 of valve device 17. Under this condition, the release valve 29 will be shifted to its release position for venting passage 41, as just described in connection with a complete independent release of locomotive brakes; however, according to a feature of the invention, as soon as pressure in the passage 43 preponderates over the reducing pressure in passage 41, the double check valve 20 will be shifted to its lower position and open passage 43 to passage 44 for causing the relay valve device 9 to control brake cylinder pressure according to the selected pressure in the independent application and release pipe 11. Hence, an automatic or an electro-pneumatic brake application may be smoothly and promptly released on the locomotive to any desired lesser degree, corresponding to the selected arcuate position of handle 46 in the application zone.

It is to be noted that if an automatic brake application is being partially or completely released on the locomotive, in the above manner, the service portion 12 will remain in its lap position (in which passage 13 is cut off from the auxiliary reservoir 6) because said portion responds only to changes in brake pipe pressure and brake pipe pressure is not affected during an independent release of locomotive brakes. Hence, the handle 46 may after a short interval (during which air is released from the displacement volume 7) be permitted to return to a non-depressed or elevated position, for venting the actuating pipe 10 and thus causing release valve 29 to return to its normal position, while maintaining independent application and release pipe 11 charged to the selected degree or vented; whereupon locomotive brakes will thereafter continue to be controlled according to the pressure in said pipe 11. However, if an electro-pneumatic brake application is being partially or completely released on the locomotive, the handle 46 should be maintained depressed so long as an electro-pneumatic brake application of greater degree is in effect on the connected cars, so as to maintain control of locomotive brakes according to the pressure in the independent pipe 11; but said handle may be permitted to assume its elevated position, if and when it is desired to reapply brakes on the locomotive in unison with those on the cars, to a degree corresponding to the pressure in the straight air pipe 2, for it will be noted that upon movement of the handle to elevated position, the release valve 29 will be shifted and reconnect the straight air passage 38 to passage 39 and thus enable fluid to flow to passage 41 and shift double check valve 20 against the lesser pressure in passage 43 for thereby controlling locomotive brakes according to straight air pipe pressure.

According to another feature of the invention, pipe 11 and passage 43 by-pass the release valve 29 and are constantly open to one side of the double check valve 20, which controls supply of air to the relay valve device 9; and during an independent release of an automatic or an electro-pneumatic brake application on the locomotive, the passage 41 (leading to the other end of said check valve) is vented, instead of a passage corresponding to the passage 44 open to the brake cylinder relay control pipe 8. By virtue of this arrangement, it will be seen that even if the release valve 29 should stick in release position and hence maintain passage 41 vented, fluid under pressure may nevertheless be supplied to the relay valve device 9 via passage 43 and double check valve 20 for effecting an independent application of locomotive brakes.

Also, according to another feature of the invention, cover portion 22 and also casing portion 21 and the double check valves 19 and 20 contained therein may be the same as those in current use in the present standard 24–RL brake equipment; and also the casing portion 18 containing the release valve device 17 and embodying rearranged passage and port connections may be substituted for a corresponding casing portion now in current use. Hence, existing 24–RL brake equipments may be modified in accordance with the invention at a minimum of expense by utilizing components (casing portion 21 and cover portion 22) of the existing equipment, which is important because the improved independent application and release valve device 16 is to become the new standard.

In order to utilize the new casing portion 18 with the casing portion 21, it is merely necessary to remove the former standard quick release valve device and insert a plug 47 in casing portion 21 to close off a branch of passage 41 from a vent port uncovered by the former quick release check valve; and also to insert a plug 49 in casing portion 18 in a branch of passage 26 leading to a cavity 48 in which said former standard valve device was housed, the latter branch being provided for standardization of the casing portion 18 and to adapt it for use in an independent application and release valve device of the type shown in Fig. 2 of the accompanying drawing.

*Description and operation.—Fig. 2*

According to this embodiment of the invention, an independent application and release valve device 16a differs from the valve device 16 described in connection with the embodiment of Fig. 1, primarily in that an interlock valve device 51 is interposed between the straight air pipe 2 and passage 38 for dispensing with the necessity of maintaining the independent brake valve handle 46 depressed following a complete or partial independent release of an electro-pneumatic brake application on the locomotive, such as is required in the embodiment of Fig. 1 to prevent a reapplication of electro-pneumatic brakes on the locomotive. Accordingly, like reference numerals have been used to designate the structure shown in Fig. 2 which is identical with that shown in Fig. 1 and already described; and only such features of the structure and operation of the embodiment of Fig. 2 which differ from that of the embodiment of Fig. 1 will hereinafter be described.

As shown in Fig. 2, the interlock valve device 51 is mounted on a suitable pipe bracket 52 to which are connected a branch of the straight air pipe 2, a pipe 53 leading to the passage 38, and a pipe 54 which is constantly open to a branch of the passage 39 in a slightly modified casing portion 18a.

The interlock valve device 51 may, for sake of illustration, comprise a flexible diaphragm 55 suitably clamped about its outer edge between sections of a casing 56 and subject at one side to pressure of fluid in a control chamber 57 and at the opposite side to pressure of fluid in a chamber 58. The diaphragm 55 is operably connected through the medium of a diaphragm follower to a coaxially arranged operating stem 59 which extends through the chamber 58 and projects through a casing partition 60 into a chamber 61. To the projecting end of stem 59 is coaxially connected a tapered supply valve 62 that is adapted to seat against a suitable tapered seat in a coaxially arranged annular plunger 63 slidably mounted in a casing partition separating the chamber 61 from a chamber 64.

When pressures of fluid in the chambers 57 and 58 are substantially equal, a helical spring 65 in chamber 58 urges the diaphragm follower to a position for unseating the supply valve 62 and therby permitting fluid under pressure to flow from chamber 61 to chamber 64 via the annular plunger 63. When pressure of fluid in chamber 58 is reduced more than a relatively slight degree below the pressure of fluid in chamber 57, diaphragm 55 will deflect against resistance of spring 65 for successively seating the supply valve 62 against one end of the plunger 63 and then shifting said plunger downwardly to unseat an exhaust valve 66, formed integrally with the opposite end of said plunger, against resistance of a light bias spring 67 in chamber 64. With the supply valve 62 seated, fluid flow will be prevented from chamber 61 to chamber 64; and with exhaust valve 66 unseated, fluid under pressure will be released from passage 38 via pipe 53, chamber 64, unseated valve 66, and an elongated annular cavity 68 formed in the plunger 63 intermediate its end and constantly open to atmosphere via a passage 69.

In operation, assume that the independent brake valve handle 46 is in release position, and that the release valve 29 is consequently in its normal position, in which it is shown. Assume now that fluid under pressure is supplied to the straight air pipe 2 for effecting an electro-pneumatic brake application throughout the train.

On the locomotive, fluid will flow via a branch of the straight air pipe 2 to a passage 70 in the pipe bracket 52, whence it will flow past the unseated supply valve 62 to chamber 64 and thence via a passage 71 in said pipe bracket and pipe 53, passage 38, and cavity 31 of release valve 29 in normal position, to passage 39 for effecting an electro-pneumatic brake application on the locomotive, in the same manner as described in connection with Fig. 1. Some of the fluid thus supplied to passage 39 will flow via one branch thereof, pipe 54, and a passage 72 in pipe bracket 52 to one side of a normally seated check valve 73 and unseat said check valve against resistance of a light bias spring 74, and then flow via a passage 75 to the chamber 58 of interlock valve device 51; it being noted that fluid under pressure will concurrently be supplied via another branch of passage 70 and at the restricted rate controlled by a choke 76 to a volume 77 constantly open to the control chamber 57 of said interlock valve device; although volume 77 may be eliminated, if desired, and the volume of said chamber 57 enlarged. The choke 76 and volume 77 are provided to so restrict the rate of build-up of pressure in control chamber 57 during an electro-pneumatic brake application as to assure that pressure in chamber 58 can increase at a faster rate and thereby "hold up" diaphragm 55 to assure that valve 62 will be maintained unseated.

When the straight air pipe 2 is vented for effecting a release of brakes throughout the train, fluid under pressure will be released from the control chamber 57 of valve device 51 and volume 77 past a spring-biased check valve 78 to the vented straight air passage 70, in by-pass of the choke 76; and also air will be vented from chamber 58 via passage 75, a choke 79 by-passing the check valve 73, the passage 72, pipe 54 and passage 39, which latter passage will have been vented by reverse flow through the communication described in connection with an application of brakes. Since chamber 58 is vented at a more restricted rate than chamber 57, the valve 62 will be maintained unseated for permitting such reverse flow.

Choke 79 and check valve 73, which are thus arranged in parallel between the passages 72 and 75, are provided for permitting substantially unrestricted flow to the chamber 58 to "hold up" the diaphragm 55 during an electro-pneumatic brake application, while providing restricted release of fluid from chamber 58 to thereby assure that said diaphragm will not be deflected downwardly and undesirably release locomotive brakes when and if a temporary reduction in straight air pipe pressure should occur due to the usual speed-controlled magnets (not shown) operating to increase the braking ratio by cutting in a larger diaphragm and its consequently enlarged chamber in the usual multidiaphragm relay valve (not shown).

Assume now that an electro-pneumatic brake application is in effect on the locomotive and connected cars and that it is desired to completely or partially release the locomotive brakes. To effect a complete release of locomotive brakes, the independent brake valve handle 46 (Fig. 1) is depressed in release position for charging the actuating pipe 10, while maintaining the independent application and release pipe 11 vented; whereas to effect a partial release said handle is depressed in the application zone to not only charge the pipe 10 but also supply fluid at a pressure corresponding to the handle setting in said zone to the pipe 11 and passage 43.

In either event, fluid under pressure thus supplied to pipe 10 will flow via passage 26 to chamber 25 for causing release valve 29 to be shifted to its release position, in which passage 38 is deadened at cavity 31; and in which passage 39 and hence brake cylinder relay pipe 8 is vented via double check valve 19 and passage 41 which is then vented via check valve 36, and additionally vented via cavity 32 and atmospheric chamber 28. Fluid under pressure will then be released from chamber 58 of interlock valve device 51 via passage 75, choke 79, passage 72, pipe 54 and the vented passage 39, at the rate controlled by said choke. Straight air pipe pressure in chamber 57 will then cause the diaphragm to deflect against resistance of spring 65 for successively seating valve 62 and then unseating exhaust valve 66; whereupon fluid under pressure in passage 38 will be vented via pipe 53, passage 71, unseated valve 66, and vent passage 69.

With the passages 38 and 39 both vented, manual force may be released from the handle 46 to permit it to move up in release position or in the application zone for venting the actuating pipe 10 and thereby causing the release valve 29 to be returned to its normal position, in which passages 38, 39 are reconnected. Since passage 38 is cut off from the straight air pipe 2 and is vented by operation of device 51, locomotive brakes will be controlled according to the pressure then existing in the independent pipe 11 and passage 43 and according to any subsequent variations therein, without need for continuous depression of the handle 46, until the straight air pipe is substantially vented; whereupon diaphragm 55 will be deflected by the spring 65 for reopening valve 62 and closing exhaust valve 66, and thereafter locomotive brakes will be controlled according to variations in straight air pipe pressure unless an independent application of a greater degree is made, and until a subsequent complete or partial independent release of locomotive brakes, as will be understood from previous description.

Hence, according to this embodiment of the invention, there is no need to maintain the handle 46 depressed in order to prevent a reapplication of electro-pneumatic brakes on the locomotive, following a complete or partial independent release of locomotive brakes. This arrangement is especially desirable when the locomotive is required to descend long grades.

*Description and operation.—Fig. 3*

According to this embodiment of the invention, the independent application and release valve device 16b differs from the valve device 16 described in connection with the embodiment of Fig. 1, primarily in the provision of a new casing portion 21a or check valve case containing an additional release valve device 80 (which is substantially similar to that heretofore used) and also embodying new porting arrangements whereby valve devices 17 and 80 serially control a communication via which fluid under pressure is released from passage 41 to atmosphere during an independent release of an automatic or an electro-pneumatic brake application, for reasons hereinafter to be explained. Like reference numerals will be used to designate items identical with those already described, and only those features of structure and operation which differ from that already described will hereinafter be described in detail.

The valve device 80 may, for sake of illustration, comprise a flexible diaphragm 81 suitably clamped about its outer edge between sections of casing portion 21a; said diaphragm being subject at one side to pressure of fluid in a chamber 82 constantly open to a branch of passage 26, and subject at the opposite side to pressure of a helical bias spring 83 in an atmospheric chamber 84. The diaphragm 81 is operatively connected through the medium of a coaxially arranged diaphragm follower to a coaxially arranged operating stem 85 that extends through chamber 84 and projects into an atmospheric chamber 86; said stem having slidably guided engagement with the wall of an aligned bore in a casing partition separating the chambers 84, 86.

The stem 85 is adapted to abuttingly engage and operatively unseat a coaxially arranged check valve 87 controlling communication between a chamber 88 and the chamber 86; said check valve being urged to a seated position by pressure of a helical bias spring 89 in chamber 88. The chamber 88 is constantly open by way of a passage 90 to a chamber 35a that is defined between the projecting end of release valve 29 and check valve 36 and is closed off from atmosphere by a plug 91.

A plug 92 is inserted in the branch of passage 39 shown connected to the pipe 54 in Fig. 2, if as is assumed for purposes of the present embodiment, the interlock valve device 51 (Fig. 2) is not to be used; however, if preferred, plug 92 may be removed and valve device 51 and the structure associated therewith may be installed to provide the electro-pneumatic lockout feature described in connection with Fig. 2.

In operation, assume that the independent brake valve handle 46 is in release position; and that with the actuating pipe 10 thus vented, the release valve 29 is in its release position; and that the check valves 36 and 87 are properly seated. Under this condition, brakes on the locomotive will be controlled in unison with those on the connected cars, according to variations in brake pipe pressure or straight air pipe pressure, as described in connection with the embodiment of Fig. 1.

Assume now that the independent brake valve handle 46 (Fig. 1) is depressed in release position or in the application zone while an automatic or electro-pneumatic brake application is in effect throughout the train. Under this condition, fluid under pressure will be supplied via actuating pipe 10 and passage 26 to chamber 25 of valve device 17 for shifting the release valve 29 to its release position, in which the stem 34 unseats check valve 36 for permitting air to flow from passage 41 to chamber 35a and thence via passage 90 to chamber 88 of valve device 80. Meanwhile, fluid under pressure will also flow via another branch of passage 26 to chamber 82, causing diaphragm 81 to deflect against resistance of spring 83 and, through the medium of stem 85, to unseat the check valve 87 and thus open chamber 88 to atmospheric chamber 86 for venting the air supplied to chamber 88 from passage 41; whereupon locomotive brakes will be controlled according to the pressure of fluid supplied to the independent pipe 11 and passage 43, in the manner already described.

It will thus be noted that an automatic or an electro-pneumatic brake application is independently released on the locomotive by releasing air from passage 41 via a communication controlled by both valve device 17 and valve device 80, arranged in series. By virtue of this arrangement, both check valves 36 and 87 must be concurrently unseated in order to open passage 41 to atmosphere.

If, when the independent brake valve handle 46 is thereafter permitted to move to its elevated or non-depressed position for venting the actuating pipe 10 and hence chambers 25 and 82, the release valve 29 should stick in release position or either (but not both) of the check valves 36, 87 should for any reason not properly seat, the passage 41 will nevertheless be cut off from atmosphere. Hence, during automatic operation, upon a subsequent increase or decrease in brake pipe pressure, the service portion 12 will shift out of its lap position and locomotive brakes will be thereafter controlled automatically in unison with those on the cars according to variations in brake pipe pressure, despite any of the conditions just described, assuming of course that the arcuate position of independent brake valve handle 46 is such that pressure of fluid in the passage 43 is less than that in the passage 13.

On the other hand, assume that when the actuating pipe 10 is vented, the release valve 29 returns to normal position but either of the check valves 36, 87 fails to properly seat; and assume further that an electro-pneumatic brake application is then in effect on the cars. Under this condition, the electro-pneumatic brake application will immediately become effective on the locomotive provided that the plug 92 is used and that any pressure in passage 43 is less than that in the straight air pipe 2. (If plug 92 is removed and the interlock valve device 51 of Fig. 2 is used, then the electro-pneumatic brake application will be locked out on the locomotive until the straight air pipe 2 is substantially vented; but thereafter locomotive brakes will be controlled according to straight air pipe pressure, as will be understood from previous description.)

Hence the independent application and release valve device 16b embodies a novel safety feature whereby locomotive brakes may be controlled automatically or electro-pneumatically, as desired, even under the conditions just described. By way of contrast, with apparatus heretofore proposed a failure of either the release selector valve device or quick release valve device could prevent any brake application whatsoever on the locomotive.

It will of course be understood that even in the unlikely event of a double failure of the valve devices 17 and 80, locomotive brakes may nevertheless be controlled independently according to pressure of fluid supplied to the independent application and release pipe 11.

SUMMARY

It will now be seen that the improved application and release valve device, in each of its three embodiments, permits brakes to be applied independently of those on the connected cars according to the pressure of fluid supplied to the independent application and release passage 43, even if the release valve device 17 should stick in its release position; and also permits a smooth and prompt independent release of locomotive brakes to any desired degree less than that then existing on the cars, such that locomotive brakes will be applied according to the preselected setting of handle 46 in the application zone. Also the release valve device 17 is biased by a spring 27 to normal position, for assuring more positive operation of the release valve 29, even if the main reservoir pipe 14 should break or main reservoir pressure should be reduced as when a locomotive is being hauled dead in a train; moreover, the release valve device 17 is relatively inexpensive since it embodies no differential piston arrangement and expensive slide valve, such as heretofore used, and the possibility of failure due to faulty maintenance is minimized.

According to the embodiment of Fig. 2, an interlock valve device 51 is added to the basic structure shown in Fig. 1, for providing lockout of an electro-pneumatic brake application on the locomotive following an independent release of such application on the locomotive and until the straight air pipe 2 is substantially vented. When this interlock valve device is used, it is not necessary to continuously maintain the independent brake valve handle 46 depressed in order to "hold-off" the electro-pneumatic brake application on the locomotive, and hence the valve device is desirable where the locomotive is used in territory where trains must descend long grades.

According to the embodiment of Fig. 3, the basic structure of Fig. 1 is modified somewhat and a release valve device 80 is provided in addition to release valve device 17. These valve devices are both controlled by actuating pipe pressure and arranged to serially control a release communication through which air may be released from passage 41 to atmosphere. With this arrangement, locomotive brakes may be controlled automatically or electro-pneumatically despite certain described failures of one or the other of the valve devices 17, 80 because operation of only one of these valve devices to cut off passage 41 from atmosphere will assure that said passage 41 may be effectively charged for supplying air to the brake cylinder relay valve device 9.

Having now described the invention, what we claim as new and desire to secure by Letters Patent, is:

1. In a locomotive fluid pressure brake apparatus, the combination of means providing a communication to which fluid under pressure is supplied for effecting an application of locomotive brakes and from which fluid under pressure is released for effecting a release of locomotive brakes, means providing a first passage that is chargeable with fluid under pressure for causing locomotive brakes to be applied in unison with those on the connected cars of a train, means providing an independent application and release passage that is chargeable with fluid under pressure for causing locomotive brakes to be applied independently of those on the cars, valve means constantly connected to said independent passage and controlled by opposing pressures of fluid in said first passage and said independent passage and operative to provide in said communication fluid at a pressure corresponding to that in the more highly pressurized of the aforesaid passages, independent release valve means operative under one condition to connect a branch of said first passage to atmosphere in by-pass of the first-mentioned valve means to release fluid under pressure from said first passage but not said independent passage for causing said first-mentioned valve means to thereupon operate to control locomotive brakes according to pressure of fluid in said independent passage, said independent release valve means normally being so conditioned as to be ineffective to release fluid under pressure from said first passage to atmosphere, and means under control of the operator for controlling conditioning of said independent release valve means.

2. An independent application and release valve device for a locomotive brake apparatus, said valve device comprising a communication to which fluid under pressure is supplied for effecting an application of locomotive brakes and from which such fluid under pressure is released for effecting a release of locomotive brakes, a first passage that is chargeable with fluid under pressure for causing locomotive brakes to be applied in unison with those on the connected cars of a train, an independent application and release passage that is chargeable with fluid under pressure for causing locomotive brakes to be applied independently of those on the cars, valve means constantly connected to said independent passage and controlled by opposing pressures of fluid in said first passage and said independent passage and operative to provide in said communication fluid at a pressure corresponding to that in the more highly pressurized of the aforesaid passages, a normally vented actuating passage, and independent release valve means responsive to charging of the actuating passage to connect a branch of said first passage but not said independent passage to atmosphere in by-pass of the first-mentioned valve means for causing locomotive brakes to thereupon be controlled by the first-mentioned valve means according to pressure of fluid in said independent passage.

3. In a locomotive brake apparatus, the combination of means operable by fluid under pressure for causing an application of locomotive brakes and responsive to release of such fluid under pressure for causing a release of locomotive brakes, a normally charged brake pipe, a first conduit, first valve means responsive to a reduction in brake pipe pressure below its normal full charge value to supply fluid under pressure to said first conduit, a straight air pipe, a second conduit normally open to said straight air pipe, a third conduit, second valve means controlled by opposing pressures of fluid in said first and second conduits and operative to provide in said third conduit fluid at the pressure of fluid in whichever one of said first and second conduits is charged with fluid at the preponderant pressure, an independent application and release pipe chargeable with fluid at a selectable pressure or ventable to atmosphere, third valve means constantly connected to said independent pipe and controlled by opposing pressures of fluid in said third conduit and said independent pipe and operative to provide in the first-mentioned means fluid at the pressure of fluid in said third conduit or in said independent pipe selectively according to whether said third conduit or independent pipe is charged with fluid at the higher pressure, a normally vented actuating pipe, and independent release value means responsive to charging of said actuating pipe to close off said straight air pipe from said second conduit and connect a branch of said third conduit to atmosphere in by-pass of said third valve means for causing pressure of fluid in the first-mentioned means to thereupon be controlled by said third valve means according to the pressure in said independent pipe.

4. In a locomotive brake apparatus, the combination of a first conduit charged with fluid under pressure during an automatic application of brakes, a straight air pipe, a second conduit normally open to said straight air pipe, a third conduit, first double check valve means operative to selectively connect to said third conduit whichever one of said first and second conduits is charged with fluid at the preponderant pressure, an independent application and release pipe chargeable with fluid at a selectable pressure or ventable to atmosphere, a fourth conduit to which fluid under pressure is supplied for causing an application of locomotive brakes and from which fluid under pressure is released for causing a release of locomotive brakes, second double check valve means constantly open to said independent pipe and operative to selectively connect to said fourth conduit either said third conduit or said independent pipe according to which of these is charged with fluid at the preponderant pressure, a normally vented actuating pipe, and independent release means normally in one position for connecting said second conduit to said straight air pipe and disconnecting a branch of said third conduit from atmosphere and responsive to charging of said actuating pipe to move to a release position for connecting said branch of said third conduit to atmosphere and disconnecting said second conduit from said straight air pipe for thereby independently releasing an automatic or straight air brake application on the locomotive while causing locomotive brakes to be controlled by said second double check valve means according to pressure of fluid in said independent pipe.

5. In a locomotive brake apparatus, the combination of means operable by fluid under pressure for causing an application of locomotive brakes and responsive to release of such fluid under pressure for causing a release of locomotive brakes, a normally charged brake pipe, a first conduit, first valve means responsive to a chosen reduction in brake pipe pressure below normal full charge value to supply fluid under pressure to said first conduit and then bottle up fluid in said first conduit at a pressure corresponding to said chosen reduction, a straight air pipe, a second conduit, means providing a normally open communication connecting said straight air pipe with said second conduit, a third conduit, second valve means controlled by opposing pressures of fluid in said first and second conduits and operative to selectively provide in said third conduit fluid at the pressure of fluid in whichever one of said first and second conduits is charged with fluid at the preponderant pressure and responsive to release of fluid under pressure from said third conduit to release fluid under pressure from said first and second conduits, an independent application and release pipe chargeable with fluid at a selectable pressure or ventable to atmosphere, third valve means controlled by opposing pressures of fluid in said third conduit and said independent pipe and operative to provide in the first-mentioned means fluid at the pressure of fluid in said third conduit or in said independent pipe selectively according to whether said third conduit or independent pipe is charged with fluid at the higher pressure, a normally vented actuating pipe, independent release valve means having a normal position in which it is ineffective to prevent flow through said communication and responsive to charging of said actuating pipe to move to a release position to close said communication and connect said third conduit to atmosphere, interlock valve means comprising a movable abutment subject to pressure of fluid in a control chamber acting in opposition to pressure of fluid in another chamber and a spring bias, first choke and check valve means interposed between said straight air pipe and control chamber and arranged for providing restricted flow from the straight air pipe to the control chamber and substantially unrestricted flow in the reverse direction, second choke and check valve means interposed between said other chamber and second conduit and arranged for providing restricted flow from said other chamber to said second conduit and substantially unrestricted flow in the reverse direction, said interlock valve means being responsive to a reduction in pressure in said other chamber below that in said control chamber to move to a lockout position for closing said communication until pressure in said control chamber is reduced to substantially the value of pressure in said other chamber.

6. In a locomotive fluid pressure brake apparatus, the combination of means operable by fluid under pressure for effecting an application of locomotive brakes and responsive to release of such fluid for effecting a release of locomotive brakes, a straight air pipe, means providing a first communication, means providing an independent application and release communication, valve means constantly connected to said independent communication and operative for providing in the first-mentioned means fluid at a pressure corresponding to that in the more highly pressurized one of the aforesaid communications, an actuating pipe, operator-controlled means for supplying fluid at a selectable pressure to said independent communication or venting the latter to atmosphere, operator-controlled means for supplying fluid under pressure to said actuating pipe or venting the latter to atmosphere, and independent release valve means comprising a movable abutment subject to pressure of fluid in said actuating pipe in opposition to a spring bias, said independent release valve means being operative by said spring bias responsively to venting of said actuating pipe to move to one position for permitting flow of fluid under pressure from said straight air pipe to said first communication and blanking off a branch of said first communication from atmosphere and responsive to charging of said actuating pipe to move to a release position for cutting off said straight air pipe from said first communication and opening said branch of said first communication to atmosphere in by-pass of the first-mentioned valve means for causing pressure of fluid in the first-mentioned means to thereupon be controlled by the first-mentioned means according to pressure of fluid in said independent communication.

7. In a locomotive brake apparatus, the combination of means operable by fluid under pressure for causing an application of locomotive brakes and responsive to release of such fluid under pressure for causing a release of locomotive brakes, a normally charged brake pipe, a first conduit, first valve means responsive to a chosen reduction in brake pipe pressure below normal full charge value to provide in said first conduit fluid at a pressure corresponding to said chosen reduction, a straight air pipe, a second conduit normally open to said straight air pipe, a third conduit, second valve means controlled by opposing pressures of fluid in said first and second conduits and operative to provide in said third conduit fluid at the pressure of fluid in said first conduit or second conduit selectively according to whether said first conduit or second conduit is charged with fluid at the higher pressure, an independent application and release pipe chargeable with fluid at a selectable pressure or ventable to atmosphere, third valve means controlled by opposing pressures of fluid in said third conduit and said independent pipe and operative to provide in the first-mentioned means fluid at the pressure of fluid in said third conduit or in said independent pipe selectively according to whether said third conduit or independent pipe is charged with fluid at the higher pressure, an actuating pipe, means providing a release communication leading from said third conduit to atmosphere, two fluid pressure controlled release valve devices each of which responds to one condition of pressure in said actuating pipe to move to a respective normal position for preventing flow through said communication and each responding to another condition of pressure in said actuating pipe to move to a respective release position for permitting flow through the part of said communication that it controls, said release valve devices being serially arranged to so control flow through said communication that both release valve devices must operate to their release positions to effect opening of said communication but operation of either to its normal position will effect closure of said communication, at least one of said release valve devices being operative in its release position to cut off said straight air pipe from said second conduit, operator-controlled means for controlling conditioning of said actuating pipe, and operator-controlled means for controlling pressure in said independent pipe.

8. In a locomotive fluid pressure brake apparatus, the combination of means operable by fluid under pressure for causing an application of locomotive brakes and responsive to a release of such fluid under pressure for causing a release of locomotive brakes, means providing two separate fluid pressure communications, fluid pressure controlled valve means operative to selectively open to the first mentioned means one or the other of said fluid pressure communications according to which of these communications is charged with fluid at the preponderant pressure and constantly subject to pressure of fluid in said other communication, a normally charged brake pipe, other valve means responsive to a chosen reduction in brake pipe pressure below normal full charge value to supply fluid at a corresponding pressure to said one communication and then terminate such supply and responsive to a subsequent increase in brake pipe pressure to release fluid under pressure from said one communication, operator-controlled valve means for providing fluid at a selectable pressure in said other communication or venting the latter to atmosphere, independent release means operative under one condition to connect said one communication to atmosphere independently of both said other valve means and said fluid pressure controlled valve means for causing pressure in the first-mentioned means to be controlled by said fluid pressure controlled valve means according to the pressure then existing in said other communication, said independent release means normally being so conditioned as to be ineffective to cause such independent connection of said one communication to atmosphere, and means under control of the operator for controlling conditioning of said independent release means.

9. In a locomotive brake apparatus, the combination of means operable by fluid under pressure for causing an application of locomotive brakes and responsive to release of such fluid under pressure for causing a release of locomotive brakes, means providing two separate fluid pressure communications, first fluid pressure controlled valve means operative to selectively open to the first-mentioned means one or the other of said communications according to which of these communications is charged with fluid at the preponderant pressure and constantly subject to pressure of fluid in said one communication, operator-controlled valve means for providing fluid at a selectable pressure in said one communication or venting the latter to atmosphere, a straight air pipe, fluid pressure controlled independent release valve means normally conditioned to permit flow of fluid under pressure from said straight air pipe to said other communication and operative under another condition to cut off said straight air pipe from said other communication and open a branch of said other communication to atmosphere independently of said first fluid pressure controlled valve means for causing pressure in the first-mentioned means to be controlled by said first fluid pressure controlled valve means according to the pressure then existing in said one communication, and means under control of the operator for controlling conditioning of said independent release valve means.

10. In a locomotive fluid pressure brake apparatus, the combination of means operable by fluid under pressure for causing an application of locomotive brakes and responsive to release of such fluid under pressure for causing a release of locomotive brakes, means providing two separate fluid pressure communications, fluid pressure controlled valve means operative to selectively open to the first-mentioned means one or the other of said communications according to which of these communications is charged with fluid at the preponderant pressure, operator-controlled valve means for providing fluid at a selectable pressure in said one communication or venting the latter to atmosphere, a straight air pipe, a conduit, interlock means controlled by opposing pressures in a first chamber and a second chamber, said first chamber being open to said straight air pipe and said second chamber being open to said other communication, said interlock means normally being biased to one position for opening said straight air pipe to said conduit and responsive to venting of said other communication while said straight air pipe is charged to move to a lockout position for disconnecting said straight air pipe from said conduit and venting the latter, said interlock means being thereafter responsive to venting of said first chamber via said straight air pipe to return to its said one position, fluid pressure controlled independent release valve means normally conditioned to permit fluid flow from said conduit to said other communication and operative under another condition to cut off said conduit from said other communication and open the latter to atmosphere for causing pressure in the first-mentioned means to be controlled according to the pressure then existing in said one communication, and means under control of the operator for controlling conditioning of said independent release valve means.

11. In a locomotive brake apparatus, the combination of means operable by fluid under pressure for causing an application of locomotive brakes and responsive to release of such fluid under pressure for causing a release of locomotive brakes, a normally charged brake pipe, a first conduit, first valve means responsive to a chosen reduction in brake pipe pressure below normal full charge value to supply fluid under pressure to said first conduit and then bottle up fluid in said conduit at a pressure corresponding to said chosen reduction, a straight air pipe, a second conduit, means providing a normally open communication connecting said straight air pipe with said second conduit, a third conduit, second valve means controlled by opposing pressures of fluid in said first and second conduits and operative to provide in said third conduit fluid at the pressure of fluid in whichever one of said first and second conduits is charged with fluid at the preponderant pressure and responsive to release of fluid under pressure from said third conduit to release fluid under pressure from said first and second conduits, an independent application and release pipe chargeable with fluid at a selectable pressure or ventable to atmosphere, third valve means controlled by opposing pressures of fluid in said third conduit and said independent pipe and operative to provide in the first-mentioned means fluid at the pressure of fluid in said third conduit or in said independent pipe selectively according to whether said third conduit or independent pipe is charged with fluid at the higher pressure, a normally vented actuating pipe, independent release valve means having a normal position in which it is ineffective to prevent flow through said communication and responsive to charging of said actuating pipe to move to a release position to close said communication and connect said third conduit to atmosphere, and interlock valve means controlled by pressure of fluid supplied from said straight air pipe opposing pressure of fluid supplied from said second conduit and a spring bias, said interlock valve means being responsive to venting of said second conduit while said straight air pipe is charged to close said communication and maintain same closed until said straight air pipe is substantially vented ,despite intervening operation of said independent release valve means to its normal position.

References Cited in the file of this patent

UNITED STATES PATENTS 2,464,977     Gorman _____ Mar. 22, 1949